(No Model.)
P. A. POTTER.
SAW SET.
No. 349,601. Patented Sept. 21, 1886.
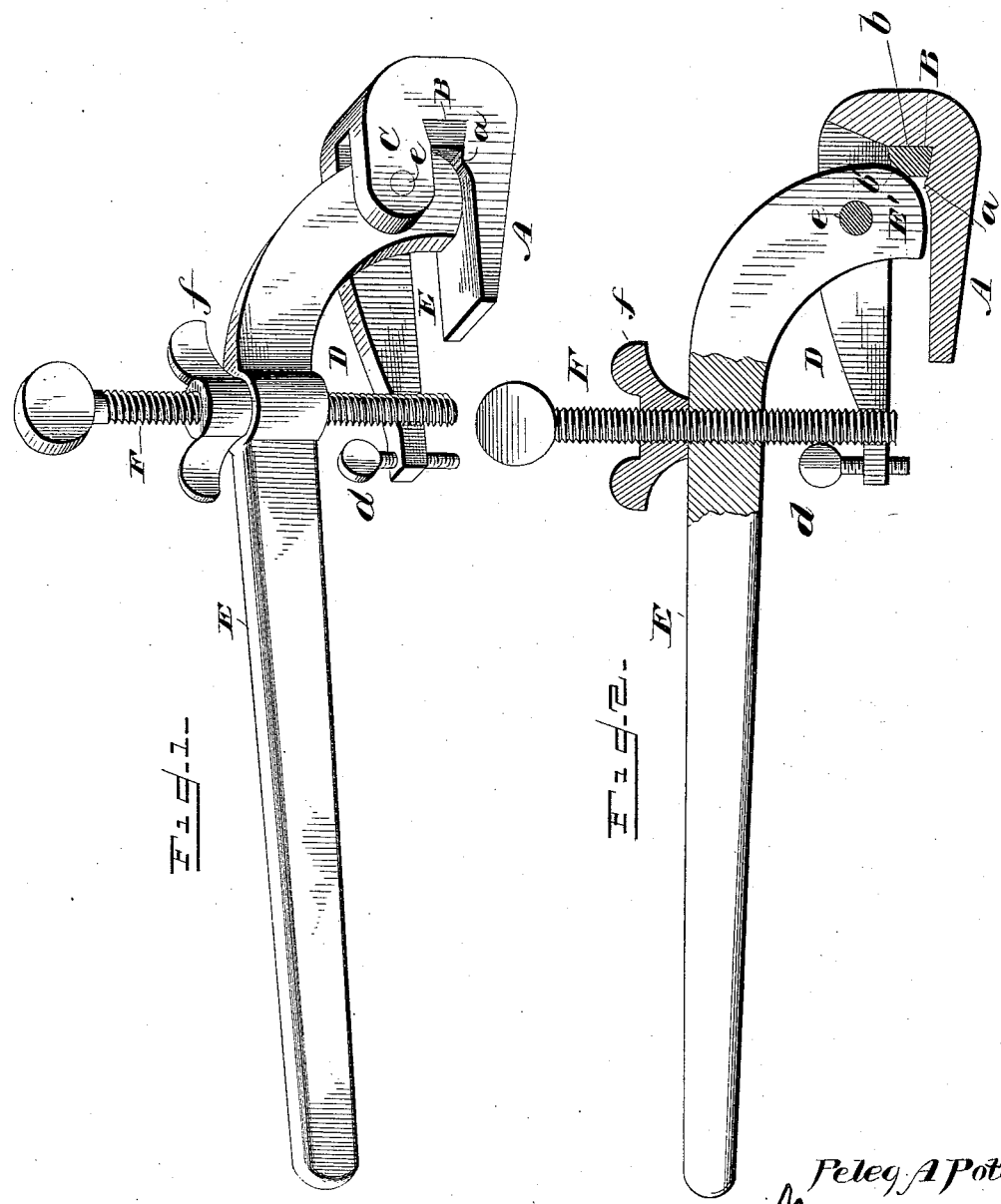
WITNESSES
G. S. Elliott
E. M. Johnson
INVENTOR
Peleg A. Potter
Attorney

UNITED STATES PATENT OFFICE.

PELEG A. POTTER, OF WELLSBOROUGH, PENNSYLVANIA.

SAW-SET.

SPECIFICATION forming part of Letters Patent No. 349,601, dated September 21, 1886.

Application filed July 1, 1886. Serial No. 206,823. (No model.)

*To all whom it may concern:*

Be it known that I, PELEG A. POTTER, a citizen of the United States of America, residing at Wellsborough, in the county of Tioga and State of Pennsylvania, have invented certain new and useful Improvements in Saw-Sets; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in implements for setting saws, the object of my invention being to provide a cheap and effective means for setting by hand the teeth of saws, so that only the end of the tooth will be bent, said implement having means for adjusting the same. My invention also consists in providing the implement with a removable gage-block, against which the teeth will abut, as will be hereinafter fully set forth, and specifically pointed out in the claims.

In the accompanying drawings, which illustrate my invention, Figure 1 is a perspective view of a hand saw-set constructed in accordance with my invention, and Fig. 2 is a sectional view.

A refers to the anvil, which is provided near its rear portion with an upwardly-projecting transverse ridge, a, upon which the teeth of the saw will rest. This anvil is provided with a transverse dovetailed groove, b, which is adapted to receive a correspondingly-shaped wooden gage-block, B, against which the ends of the teeth will abut. These gage-blocks B are made so they can be readily removed from the dovetailed recess and others of different sizes inserted. The anvil A has its rear portion formed solid, and said rear portion projects upwardly, and is provided with forwardly-projecting arms C and D, between which arms the handle E is pivotally secured by means of a pivoted pin, e. The arm D projects for a considerable distance over the upper edge of the anvil, and it is provided at its end with a set-screw, d, which is adapted to bear upon the upper face of the saw-blade.

The end E' of the handle E is eccentrically shaped, so that when the handle is raised said end will be elevated from the anvil, and when it is depressed said eccentric end will be located so as to bear upon the tooth and set the same or bend it outwardly from the body of the saw, thus giving to the teeth a slant laterally from the plane of the saw.

The handle E is provided with a set-screw, F, which extends through the same, said set-screw being employed to gage the set of the teeth. This set-screw is provided with a locking-nut, f, which will serve to hold the same in position when once adjusted. The set-screw F will be located to one side of the arm D and on a line with the handle and its eccentric end.

In setting saws having different lengths of teeth proper gage-blocks can be inserted, and as said gage-blocks are made of wood or other soft material they will not dull the points of the teeth when they come in contact with the same.

The anvil A may be suitably attached to a table or other support.

I am aware that it has been proposed to provide saw-sets with adjustable screws for regulating the movement of the handle and the position of the saw-blade, and I do not claim such construction broadly.

The device hereinbefore described may be used for setting either circular or cross-cut saws, and the same is simple and effective and can be manufactured at a small cost. It is proposed to make all the parts of my improved saw-set of metal, with the exception of the block against which the teeth of the saw will abut. The blocks B may be cut away at their centers, as shown at b', so that the curved portion of the handle will not contact therewith. Said notch or recess b' will also prevent the block from falling out of the recess.

I claim—

1. The improved saw-set herein described, consisting of an anvil or base, A, having forwardly-projecting portion D formed integral therewith, the projecting arm D being provided at its end with a set-screw, d, the handle E, provided with a curved or eccentric end below its pivot and above the anvil, and a set-screw, F, the parts being combined and organized substantially as shown, and for the purpose set forth.

2. The combination, in a handsaw-set, of an anvil, a removable block, B, and a lever having an eccentric end, said lever being pivotally secured above the anvil, substantially as shown, and for the purpose set forth.

3. In a saw-set, an anvil provided with an upwardly-projecting rear portion and forwardly-projecting arms C and D, the parts being integral with each other, and being provided in rear of the anvil with a dovetailed slot for the reception of a block, B, and a lever pivotally secured between the projecting arms C and D, the parts being combined and organized substantially as shown, and for the purpose set forth.

4. The combination, in a saw-set, of an anvil, A, having a transverse raised portion, $a$, arms C and D, projecting forwardly above said anvil, a dovetailed recess, $b$, formed between the anvil and the forwardly-projecting arms, for the reception of a block, B, a lever, E, having an eccentric end, and set-screws F and $d$, the parts being organized substantially as shown, and for the purpose set forth.

In testimony whereof I affix my signature in presence of two witnesses.

PELEG A. POTTER.

Witnesses:
I. M. BODINE,
COREY DUNHAM.